June 15, 1926.  
J. C. MATHEWS  
SCALE  
Filed Sept. 11, 1922  
1,588,975  
4 Sheets-Sheet 1

Fig.II.

Inventor  
John C. Mathews  
By Edward N. Pagelsen  
Attorney

June 15, 1926.

J. C. MATHEWS

SCALE

Filed Sept. 11, 1922

1,588,975

4 Sheets-Sheet 2

Inventor
John C. Mathews
By Edward N. Pagelsen
Attorney

June 15, 1926. 1,588,975
J. C. MATHEWS
SCALE
Filed Sept. 11, 1922 4 Sheets-Sheet 3

Inventor
John C. Mathews
By Edward N. Pagelsen
Attorney

June 15, 1926.

J. C. MATHEWS 1,588,975

SCALE

Filed Sept. 11, 1922 4 Sheets-Sheet 4

Inventor
John C. Mathews
By Edward N. Pagelsen
Attorney

Patented June 15, 1926.

1,588,975

UNITED STATES PATENT OFFICE.

JOHN C. MATHEWS, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

Application filed September 11, 1922. Serial No. 587,386.

This invention relates to spring scales of the type shown in the joint application of Louis Jaenichen and myself, filed May 26, 1922, Serial No. 563,799, in which indicating mechanism is moved progressively through equal distances for equal increases in the load on the scale, and which is provided with a movable supporting mechanism for the load resisting springs which permits the springs to be so elevated as to return the weight indicator to zero position after being moved therefrom by the force of a load, while at the same time a tare indicator is moved from zero position an indicating distance equal to that through which the weight indicator has been returned, and its object is to provide means for setting the weight indicator to zero without affecting the zero adjustment for the tare indicator and to provide auxiliary weight and tare indicators on the opposite side of a case containing the mechanism so that the weight or tare may be read simultaneously from a plurality of positions.

This invention consists in a weighing scale, in combination with a shaft for the weight indicators and a weight indicating pointer on each end thereof, of a pair of sleeves rotatably mounted concentric with the shaft and a tare indicator mounted on each sleeve, gearing for causing the two sleeves to rotate together, load resisting means to which the weight and tare indicators are connected, and means to change the position of the load resisting means to move the weight indicators in one direction and the tare indicators in the opposite direction.

It further consists in connected weight indicators and connected tare indicators mounted to rotate on the same axis, over two circular charts.

It also consists of means for adjusting the tare indicators on their axis relative to each other.

It also consists of means for adjusting the connections between the weight and tare indicators and the weight resisting mechanism so that the indicators may be set to zero position when the scale is unloaded.

It also consists in the details of construction illustrated in the accompanying drawing and particularly pointed out in the claims.

Figure 1:
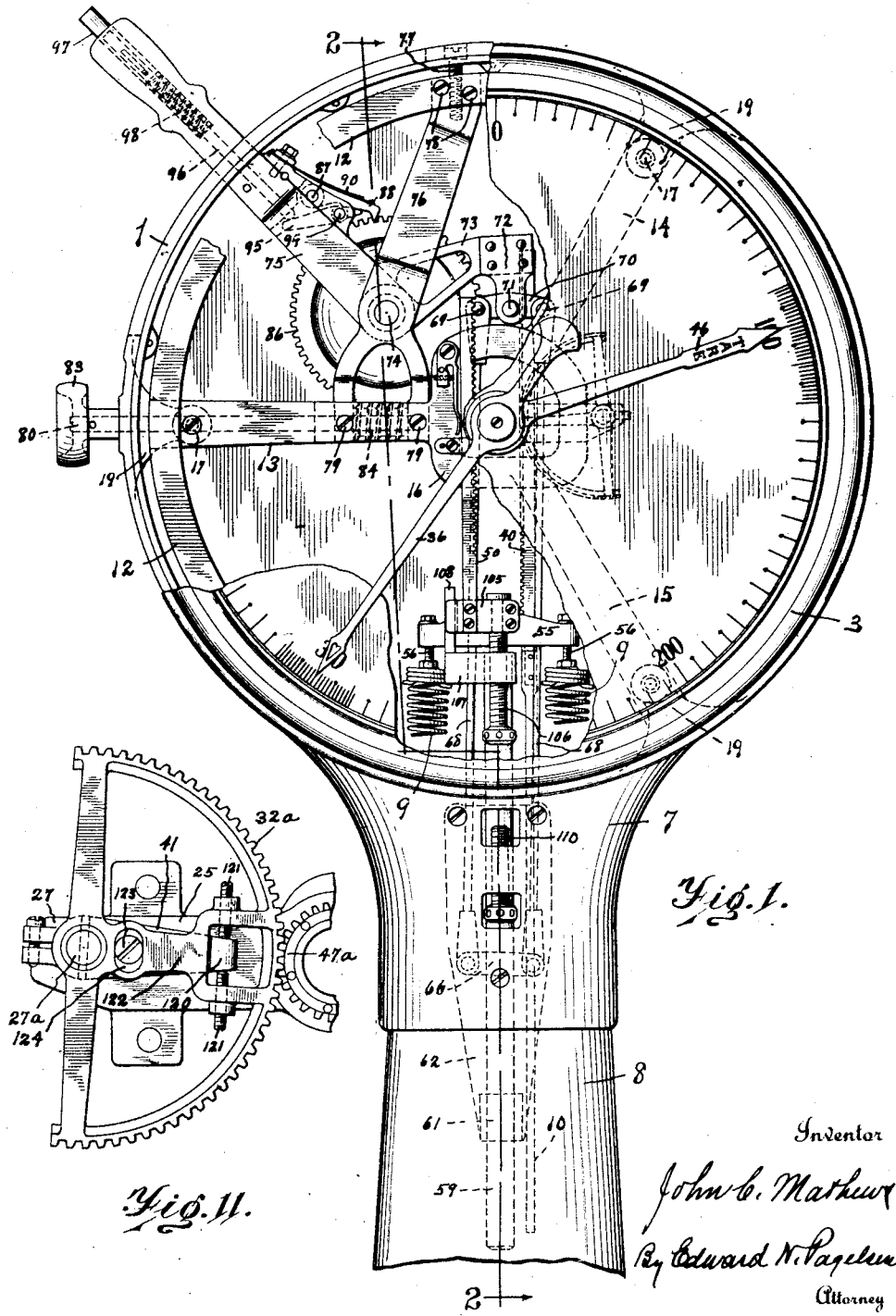
Figures 2, 3:
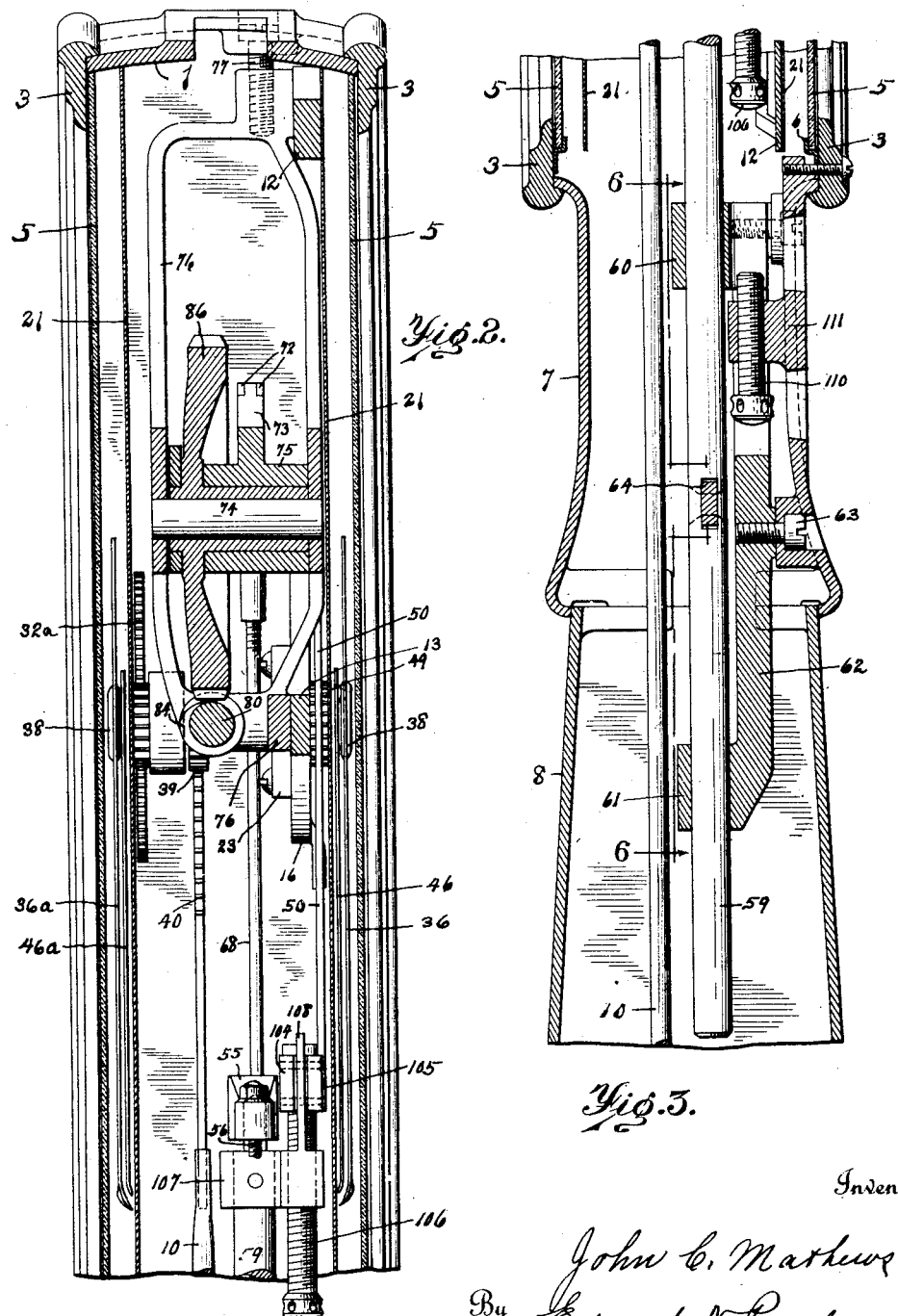
Figure 5:
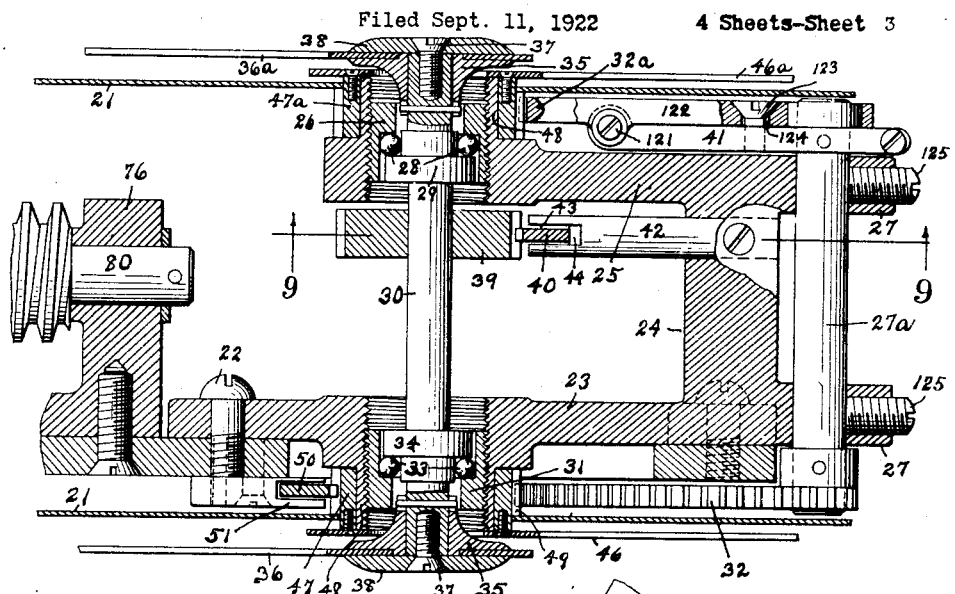
Figure 1:
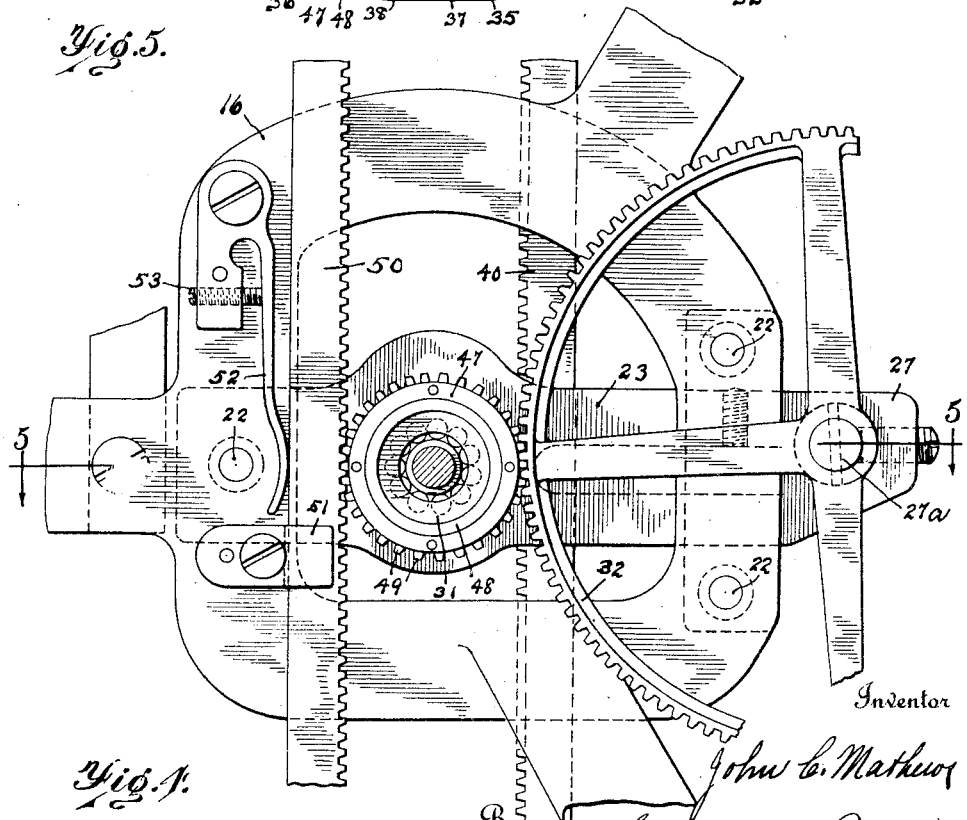
Figure 6:
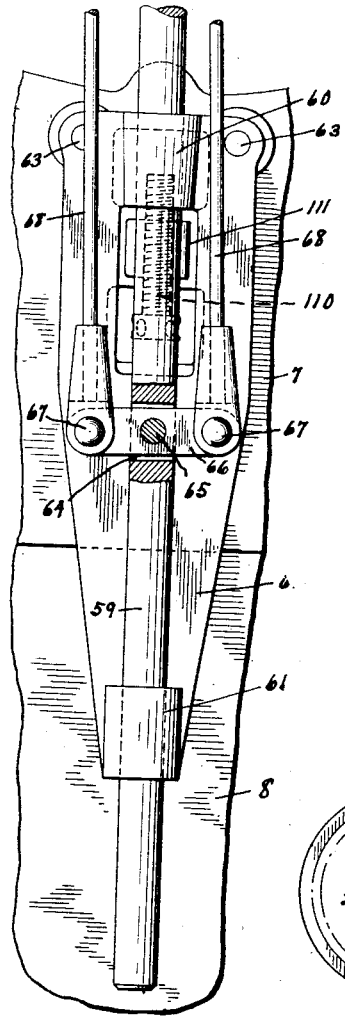
Figure 7:
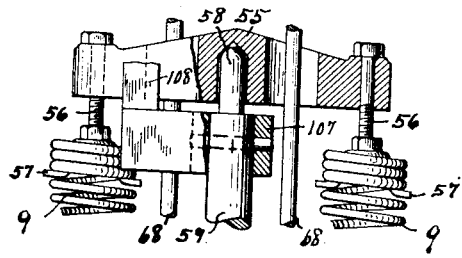
Figure 8:
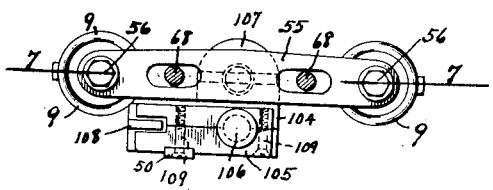
Figure 9:
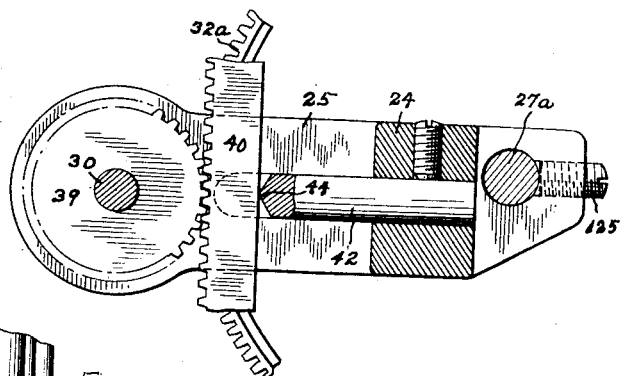
Figure 10:
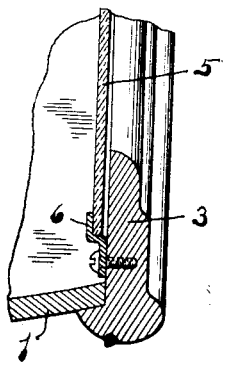

In the accompanying drawings, Fig. 1 is a front elevation of the upper portion of a scale embodying my present invention. Figs. 2 and 3 are together a section on the line 2—2 of Fig. 1 on a larger scale. Fig. 4 is a front elevation of the support for the indicators. Fig. 5 is a section on the line 5—5 of Fig. 4. Fig. 6 is a section on the line 6—6 of Fig. 3. Fig. 7 is a section on the line 7—7 of Fig. 8. Fig. 8 is a plan of the cross bar to which the upper ends of the springs are connected. Fig. 9 is a section on the line 9—9 of Fig. 5. Fig. 10 is a section of a portion of the rim of the case. Fig. 11 is an elevation of the adjusting mechanism between the two tare indicators.

Similar reference characters refer to like parts throughout the several views.

The construction shown in Figs. 1 and 2 embodies a substantially cylindrical case 1 having glass closures 5, carried by circular rings 3, held in position by occasional clips 6, as shown in Fig. 10. The case 1 has a neck 7 which in turn rests on a pedestal 8 of any desired height. This pedestal rests on a base which is not shown but within which are the usual scale levers which connect to the weight resisting springs 9 and to the weight indicator rod 10 of well known construction and which form no part of the present invention. It may be said that in this scale, as in many others, the rod 10 moves up and down with the lower ends of the springs.

Mounted within the case is a spider having a ring 12, arms 13, 14 and 15, and a hub 16. Screws 17 secure this ring to the brackets 19 extending inward from the case 1 and shown in dotted lines in Fig. 1. Dials 21 are mounted in the case and have central holes for the hubs of the tare indicators.

Referring now to Figs. 4 and 5 which show the hub 16 of the spider and the indicating mechanism, a frame is secured to this hub by means of the screws 22 and consists of a front cross bar 23, a post 24 and an arm 25 which carries the adjustable bearing ring 26 and balls 28 for the collar 29 on the rear end of the weight indicator shaft 30. The ring 31 and balls 33 support the front collar 34 on this shaft. A collar 35 is attached to each end of this shaft to which the weight indicating pointers 36 and 36ª are secured by means of the screws 37 and washers 38. On this shaft is a pinion 39 engaged by the rack bar 40 whose lower end connects to the rod 10. In order to keep the rack bar in mesh with the pinion, a guide pin 42 is mounted in the post 24, as shown in Figs. 5 and 9, and has a slot 43 in which the rack bar is guided and a pointed supporting portion 44. This rack bar moves up and down with the load receiving parts of the scale, that is, with the lower ends of the springs 9.

Tare indicating pointers 46 and 46$^a$ are secured to sleeves 47 and 47$^a$ which are rotatable on the hubs 48 on the cross bar 23 and the arm 25. The sleeve 47 has spur teeth 49 which mesh with a rack bar 50 which is guided by the clip 51 and held in engagement with the teeth 49 by means of a spring arm 52, whose tension is adjusted by means of a screw 53. This rack bar connects to the support for the load supporting springs and the mechanism hereinafter described has for its purpose to raise the supporting device for the springs sufficiently to carry the weight indicating pointer back to zero after the load container has been placed on the scale in order to deduct the tare. The rack bars 40 and 50 are substantially parallel to each other and are on opposite sides of the shaft 30.

Mounted in the lugs 27 extending from the supporting frame is a shaft 27$^a$ having a segment 32 attached to one end and meshing with the teeth 49 on the sleeve 47 and on the opposite end is loosely mounted a second segment 32$^a$ meshing with the teeth on the sleeve 47$^a$. An arm 41 is attached to the shaft 27$^a$ adjacent the segment 32$^a$ (Figs. 5 and 11) and has an out-turned end 120 engaged by the two set screws 121 mounted in the arm 122 of this segment 32$^a$. A screw 123 is slidable in a slot 124 in the arm 122 and prevents endwise movement of the segment. This permits accurate adjustment of the "tare" indicators 46 and 46$^a$ so that both may indicate the same amount. In order to obtain accurate meshing of the teeth on the segments with the teeth on the sleeves 47 and 47$^a$, the holes in the lugs 27 may be enlarged to carry either end of the shaft 27$^a$ toward the shaft 30. Flat-ended screws 125 are mounted in these lugs to press against the shaft and hold the teeth in proper mesh. As the shaft 27$^a$ turns very seldom and then only through few degrees, these screws are quite satisfactory for the purpose described.

The force of the load is transmitted to the lower ends of the springs 9 in any desired manner and these springs are connected to the ends of a cross bar 55 (Fig. 7) by means of the bolts 56 and cupped washers 57 on which the springs are adjustably mounted. This cross bar rests on a pivot 58 at the upper end of a vertically slidable rod 59 carried by the guides 60 and 61 attached to the plate 62 which is secured to the front of the neck 7 in any desired manner, screws 63 being shown.

Extending through a slot 64 in this slidable rod 59 and mounted on the pin 65 is a bar 66 having pins 67 in its ends to which the links 68 attach. These links connect at their upper ends to the pins 69 in the end of the bar 70 mounted on the pin 71 carried by plates 72 at the end of the arm 73 of a bell-crank lever whose other arm 75 is the tare-control arm of the scale. Swinging the arm 75 down toward horizontal position lifts the cross bar 55 which supports the springs and with them the whole weight supporting and indicating system.

The arm 75 is mounted on a pin 74 carried by a brace 76 which extends down from the top of the case to which it is secured by the screw 77. It is also secured to the ring 12 by screws 78. Its lower end is attached to the spider arm 13 by screws 79 and this lower end is formed with lugs (not shown) to receive the shaft 80.

On the outer end of this shaft 80 is a hand wheel or button 83 by means of which this shaft and the worm 84 thereon may be turned. This worm meshes with the worm wheel 86 which is loose on the shaft 74.

The arm 75 carries a pin 87 on which a pawl 88 is mounted and this pawl is pressed against the teeth of the worm wheel 86 by the spring 90. A pin 94 on this arm 75 carries a small dog 95 whose long arm is adapted to be engaged by the rod 96, slidable in this arm 75. This rod is forced down by the hand of the operator pressing on the cylindrical cap 97 which is normally held out by the spring 98. When this rod 96 is pushed in, the dog lifts up the pawl 88 from engagement with the worm wheel teeth.

The rack bar 50 for operating the tare indicator 46 is attached to a small block formed of two parts 104 and 105 (Fig. 8) which is rotatably mounted on the reduced upper end of a screw 106 carried by a block 107 attached to the upper end of the rod 59 just below the cross bar 55. This block 107 also carries a small guide bar 108 which extends between the two parts 104 and 105 and prevents them and the rack bar 50 from twisting. The screws 109 secure these two parts and the rack bar 50 together. Turning this screw 106 in either direction causes the rack bars 40 and 50 to move relative to each other as the "weight" rack bar 40 connects to the lever system and therefore to the springs 9, equalizer 55 and block 107, while the "tare" rack bar 50 connects to the parts 104 and 105 which are journaled on the screw 106 and do not move longitudinally thereof when this screw is turned to move up or down realtive to the block 107 and the "weight" rack bar.

A screw 110 is mounted in a stationary threaded boss 111 on the neck 7, and when the arm 75 is released and swung up to normal position, the screw 106 rests on this screw 110. When the screw 110 is turned, the screw 106 and the tare rack bar 50 move up or down so that the tar indicator 46 may be "set to zero" on the chart. When the screw 106 is turned, the block 107 and the equalizer 55 and all the parts connected thereto are moved up or down and the weight indicator thereby set to zero. The tare indicator is therefore first set to zero and thereafter the weight indicator.

When the scale is properly adjusted and empty, the indicating hands 36 and 36ᵃ and 46 and 46ᵃ should be at zero. When an empty box, case or other standard container, or truck or barrow, is placed on the scale, the hands 36 and 36ᵃ will indicate its weight, but the tare hands 46 and 46ᵃ will remain stationary at zero. The operator, while the container remains on the scale, then swings down the arm 75, the pawl 88 riding over the teeth of the worm wheel, and he thereby lifts the rod 59, the cross bar 55, the springs 9 and the parts connected to the lower ends thereof, including the rack bar 40, until the weight indicators 36 and 36ᵃ again point to zero. This movement of the lever 75 lifts the rod 59 and with it the block 107, the screw 106, the two parts 104 and 105 and the tare rack bar 50 and swings the tare pointers 46 and 46ᵃ in the opposite direction to the movement of the pointers 36 and 36ᵃ but to the same extent, so that the tare pointers 46 and 46ᵃ will now indicate the weight of the container on the scale, that is, the tare.

When articles to be weighed are now placed in the container, the hands 36 and 36ᵃ will move and indicate the net weight thereof, but the tare indicator will remain stationary and continue to indicate the tare weight of the container.

It is evident that this scale is as adapted for ordinary weighing as any other standard scale, for when the tare hands are at zero, the total weight of any load placed on the scale is indicated by the weight hands 36 and 36ᵃ. The tare mechanism remains idle unless the arm 75 is swung down.

Attention is called to the fact that the weight indicating mechanism has no connection whatever with the tare indicators and its operating mechanism and that therefore no additional friction results from this additional tare mechanism. One is entirely independent of the other in its operation. The friction of the tare mechanism is overcome by a manually operated lever and is therefore absolutely immaterial so far as the accuracy of the scale is concerned.

It is evident that the teeth of the worm wheel 86 are not sufficiently numerous for accurate adjustment when using only the pawl 88. The operator therefore moves the arm 75 until the pointers 36 and 36ᵃ are about at zero, and then turns the knob 83 to turn the worm wheel either way as required and swing the arm 75 until the pointers 36 and 36ᵃ are absolutely at zero.

The amount of tare which can be taken care of by this mechanism is virtually the total capacity of the scale, so long as the several parts are so proportioned as to lift the upper ends of the springs sufficiently for this purpose. This tare can be changed almost instantly and has no effect on the weighing capacity of the scale, that is, it has no effect on its accuracy.

The details of construction and the proportions of the parts may all be changed by skilled scale makers without departing from the spirit of my invention as set forth in the following claims.

I claim:—

1. In a scale, a pair of alined circular charts, a weight indicator and a tare indicator mounted to turn over each chart on a common axis, a shaft to which the weight indicators are attached, supporting devices for the tare indicators co-axial with said shaft but independent thereof, gearing operatively connecting the tare indicators, weight resisting means, a movable support therefor, and a connection between the support and the tare indicators.

2. In a scale, a pair of alined circular charts, a weight indicator and a tare indicator mounted to turn over each chart on a common axis, a shaft to which the weight indicators are attached, supporting devices for the tare indicators co-axial with said shaft but independent thereof, gearing operatively connecting the tare indicators, weight resisting means, a movable support therefor, a connection between the support and the tare indicators, and manually operable means to position the support.

3. In a scale, a pair of alined circular charts, a weight indicator and a tare indicator mounted to turn over each chart on a common axis, a shaft to which the weight indicators are attached, supporting devices for the tare indicators co-axial with said shaft but independent thereof, gearing operatively connecting the tare indicators, weight resisting means, a movable support therefor, a connection between the support and the tare indicators, a vertically movable bar on which the support is mounted, and means to adjust the connection to the tare indicator relative to said bar.

4. In a scale, a pair of alined circular charts, a weight indicator and a tare indicator mounted to turn over each chart on a common axis, a shaft to which the weight indicators are attached, supporting devices for the tare indicators co-axial with said shaft but independent thereof, gearing operatively connecting the tare indicators, weight resisting means, a movable support therefor, a connection between the support and the tare indicators consisting of a toothed sleeve connected to the indicator, a rack bar meshing with the toothed sleeve, and an adjustable connection between said support and rack bar.

5. In a scale, a circular graduated chart, a weight indicator and a tare indicator mounted to turn over the chart on a common axis, weight resisting means, a movable support for said weight resisting means, a connection between the support and the tare indicator embodying a screw whereby said connection may be adjusted, a stationary support, and a screw mounted therein upon which the first named screw may rest when the second screw is turned to carry the tare indicator to zero position.

6. In a scale, a weight indicator, a tare indicator, resilient weight resisting means and an adjustable support for one end thereof, an operative connection between the other end of the weight resisting means and the weight indicator, a screw to limit the movement of said support in one direction, and manually adjustable means connecting said support and the tare indicator.

7. In a scale, a pair of load resisting springs having normally stationary upper ends, a weight indicator adapted to move in proportion to the expansion of the springs, a support for the springs, a screw mounted thereon, a second screw and a stationary support therefor, said second screw normally adapted to adjustably support the first screw and the spring structure, a tare indicator, a connection between the tare indicator and the first named screw, and adjustable means for moving the spring structures and indicators relative to the second screw.

8. In a scale, weight and tare indicating devices, a spring structure and a support for one end thereof, means connecting the opposite end of the spring structure to the weight indicator and the support to the tare indicator so that the movement of the spring structure and support together in one direction will move the indicators in opposite directions, and adjustable means limiting the movement of the support in one direction so that the indicators will be at zero position when the scale is unloaded.

9. In a scale, weight and tare indicating devices, a spring structure, an adjustable connection between the spring structure and the tare indicator, means to vary the position of the spring structure to move the tare indicator to either indicate tare or zero, and adjustable means to support said spring structure when the tare indicator is at zero position.

10. In a scale, a weight indicator and a tare indicator, weight resisting springs, means connecting to the springs and weight indicator whereby the weight indicator moves in proportion to the movement of the lower ends of the springs, an adjustable connection whereby the tare indicator is caused to move in proportion to the movement of the upper ends of the springs, means to move the spring structure up and down, and an adjustable support for the spring structure.

11. In a scale, a weight indicator and a tare indicator, weight resisting means and a support therefor, connections between the weight resisting means and the weight indicator, adjustable connections between the tare indicator and the support embodying a screw, and a second screw in alinement with the first to adjustably carry said support and the parts mounted thereon when the tare indicator is inoperative.

12. In a scale, weight resisting means, a support therefor, means to indicate the operation of the weight resisting means, means to vary the position of said support, means to indicate such variation in position, and means for varying the connection between said support and the last named indicating means.

13. In a scale, a pair of load resisting springs having normally stationary upper ends, a weight indicator connected to the lower ends of the springs adapted to move in proportion to the expansion of the springs, a support for the springs, a screw mounted thereon, a second screw and a stationary support therefor, said second screw normally adapted to adjustably support the first screw and the spring structure, a tare indicator, a connection between the tare indicator and the first named screw, and a manually operable lever for moving the spring structures and weight indicators relative to the second screw.

JOHN C. MATHEWS.